(12) United States Patent
Chishiki et al.

(10) Patent No.: US 12,735,305 B2
(45) Date of Patent: Sep. 15, 2026

(54) ROUTE SETTING METHOD, PROGRAM, AND MOVING BODY

(71) Applicant: MITSUBISHI HEAVY INDUSTRIES, LTD., Tokyo (JP)

(72) Inventors: Yohei Chishiki, Tokyo (JP); Kenji Takao, Tokyo (JP); Kazushige Takaki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 92 days.

(21) Appl. No.: 18/843,078

(22) PCT Filed: Feb. 24, 2023

(86) PCT No.: PCT/JP2023/006782

§ 371 (c)(1),
(2) Date: Aug. 30, 2024

(87) PCT Pub. No.: WO2024/004272

PCT Pub. Date: Jan. 4, 2024

(65) Prior Publication Data

US 2025/0187890 A1 Jun. 12, 2025

(30) Foreign Application Priority Data

Jun. 30, 2022 (JP) ................................ 2022-106257

(51) Int. Cl.
*B66F 9/075* (2006.01)
*B66F 9/06* (2006.01)
(Continued)

(52) U.S. Cl.
CPC ............ *B66F 9/0755* (2013.01); *B66F 9/063* (2013.01); *G05D 1/622* (2024.01); *G05D 1/646* (2024.01);
(Continued)

(58) Field of Classification Search
CPC ....... B66F 9/0755; B66F 9/063; G05D 1/622; G05D 1/646; G05D 2107/70; G05D 2105/20
(Continued)

(56) References Cited

U.S. PATENT DOCUMENTS 6,064,926 A * 5/2000 Sarangapani ........ G05D 1/0289 701/414
6,246,932 B1 * 6/2001 Kageyama ........... G05D 1/0297 701/50
(Continued)

FOREIGN PATENT DOCUMENTS

JP 2006-285547 10/2006
JP 2007-310698 11/2007
(Continued)

OTHER PUBLICATIONS

International Search Report issued Apr. 11, 2023 in International (PCT) Application No. PCT/JP2023/006782, with English-language Translation.
(Continued)

*Primary Examiner* — Luis A Martinez Borrero
(74) *Attorney, Agent, or Firm* — Wenderoth, Lind & Ponack, L.L.P.

(57) ABSTRACT

The objective of the present invention is to move appropriately along a set reference route. This route setting method includes: a step for acquiring information relating to a reference route, which is a route along which a moving body moves; a step for determining whether the moving body is positioned on the reference route; and a step for setting a return route, which is a route for arriving at a merging position on the reference route, if the moving body is not positioned on the reference route.

11 Claims, 12 Drawing Sheets

(51) Int. Cl.
*G05D 1/622* (2024.01)
*G05D 1/646* (2024.01)
*G05D 105/20* (2024.01)
*G05D 107/70* (2024.01)

(52) U.S. Cl.
CPC ..... *G05D 2105/20* (2024.01); *G05D 2107/70* (2024.01)

(58) Field of Classification Search
USPC .......................................................... 701/50
See application file for complete search history.

(56) References Cited

U.S. PATENT DOCUMENTS

| | | | | |
|---|---|---|---|---|
| 8,860,564 | B2* | 10/2014 | Rubin | G01C 21/26 340/436 |
| 8,884,782 | B2* | 11/2014 | Rubin | G01C 21/26 340/436 |
| 8,922,391 | B2* | 12/2014 | Rubin | G01C 21/26 340/436 |
| 8,935,094 | B2* | 1/2015 | Rubin | G01C 21/26 701/518 |
| 10,365,657 | B2* | 7/2019 | Tokuyama | G05D 1/024 |
| 10,422,647 | B2* | 9/2019 | Shitamoto | G01C 21/206 |
| 10,997,439 | B2* | 5/2021 | Li | G06V 20/58 |
| 11,753,039 | B2* | 9/2023 | Scott | B60K 35/10 701/26 |
| 11,768,504 | B2* | 9/2023 | Ebrahimi Afrouzi | B25J 11/0085 701/25 |
| 12,116,253 | B2* | 10/2024 | Kawashima | B66F 17/003 |
| 2009/0043504 | A1* | 2/2009 | Bandyopadhyay | G01S 19/49 701/469 |
| 2013/0282271 | A1* | 10/2013 | Rubin | G01C 21/26 701/410 |
| 2013/0282277 | A1* | 10/2013 | Rubin | G01C 21/26 701/517 |
| 2014/0277691 | A1* | 9/2014 | Jacobus | B66F 9/063 700/216 |
| 2018/0017395 | A1* | 1/2018 | Shitamoto | G01C 21/206 |
| 2018/0310461 | A1 | 11/2018 | Shinkai et al. | |
| 2018/0357601 | A1* | 12/2018 | Jacobus | B66F 9/063 |
| 2019/0171238 | A1* | 6/2019 | Sasao | G05D 1/0044 |
| 2019/0187699 | A1* | 6/2019 | Salour | G05D 1/0033 |
| 2019/0310626 | A1* | 10/2019 | Salour | G05D 1/0033 |
| 2019/0367021 | A1* | 12/2019 | Zhao | B60W 30/09 |
| 2019/0367022 | A1* | 12/2019 | Zhao | B60W 30/09 |
| 2019/0369616 | A1* | 12/2019 | Ostafew | B60W 50/00 |
| 2019/0369626 | A1* | 12/2019 | Lui | G05D 1/0219 |
| 2020/0209011 | A1* | 7/2020 | Iwasaki | G01C 21/3407 |
| 2020/0288622 | A1* | 9/2020 | Nishii | A01B 69/00 |
| 2021/0035057 | A1* | 2/2021 | Jacobus | B66F 9/0755 |
| 2021/0035442 | A1* | 2/2021 | Baig | G08G 1/0116 |
| 2021/0109529 | A1 | 4/2021 | Tsusaka et al. | |
| 2021/0293561 | A1* | 9/2021 | Tamura | G01C 21/3407 |
| 2022/0147058 | A1* | 5/2022 | Dupuis | B25J 9/1666 |
| 2022/0163969 | A1* | 5/2022 | Li | G01C 21/3407 |
| 2022/0187847 | A1* | 6/2022 | Cella | G05B 19/41885 |
| 2022/0276654 | A1* | 9/2022 | Lee | G05B 19/4155 |
| 2022/0374018 | A1* | 11/2022 | Zhang | G05B 19/418 |
| 2023/0133480 | A1* | 5/2023 | Kim | B64C 39/024 701/10 |
| 2024/0310851 | A1* | 9/2024 | Ebrahimi Afrouzi | G01S 17/87 |
| 2025/0340416 | A1* | 11/2025 | Yamaguchi | B66F 9/063 |

FOREIGN PATENT DOCUMENTS

| | | |
|---|---|---|
| JP | 2021-9707 | 1/2021 |
| JP | 7004475 | 1/2022 |
| JP | 7027206 | 3/2022 |

OTHER PUBLICATIONS

Written Opinion of the International Searching Authority issued Apr. 11, 2023 in International (PCT) Application No. PCT/JP2023/006782, with English-language Translation.

* cited by examiner

S1
S2
T
T
P
P
P1
WP
A
A
L
10
10
A1
A1
PA
PA2
PA1
PA0
A3
A2
CR
Z
X
Y

ROUTE SETTING METHOD, PROGRAM, AND MOVING BODY

CROSS-REFERENCE TO RELATED APPLICATIONS

This application is a U.S. national stage application of the PCT International Application No. PCT/JP2023/006782, filed on Feb. 24, 2023, which claims the benefit of foreign priority of Japanese Patent Application No. 2022-106257, filed on Jun. 30, 2022.

TECHNICAL FIELD

The present disclosure relates to a route setting method, a program, and a moving body.

BACKGROUND ART

A technique for setting a movement route of a moving body that automatically moves is known. For example, PTL 1 describes that two isosceles triangles connecting a start position and a goal position are generated, and a curved trajectory along equilateral sides of the isosceles triangle is set as a movement route of a moving body.

CITATION LIST

Patent Literature

[PTL 1] Japanese Patent No. 7027206

SUMMARY OF INVENTION

Technical Problem

In some cases, a reference route that is a route along which the moving body needs to move is set for the moving body, and it is required for the moving body to appropriately move along the set reference route.

The present disclosure is made to solve the above-described problem, and an object of the present disclosure is to provide a route setting method, a program, and a moving body which enable an appropriate movement along a set reference route.

Solution to Problem

A route setting method according to the present disclosure includes a step of acquiring information of a reference route which is a route along which a moving body moves, a step of determining whether or not the moving body is positioned on the reference route, and a step of setting a return route which is a route for reaching a merging position on the reference route in a case where the moving body is not positioned on the reference route.

A program according to the present disclosure causes a computer to execute a step of acquiring information of a reference route which is a route along which a moving body moves, a step of determining whether or not the moving body is positioned on the reference route, and a step of setting a return route which is a route for reaching a merging position on the reference route in a case where the moving body is not positioned on the reference route.

A moving body according to the present disclosure is a moving body that automatically moves, the moving body including a reference route acquisition unit that acquires information of a reference route which is a route for moving, and a return route acquisition unit that acquires a return route which is a route for reaching a merging position on the reference route in a case where the moving body is not positioned on the reference route.

Advantageous Effects of Invention

According to the present disclosure, it is possible to appropriately move along a set reference route.

DESCRIPTION OF EMBODIMENTS

Hereinafter, a preferred embodiment of the present disclosure will be described in detail with reference to the accompanying drawings. The present disclosure is not limited to the embodiment. In addition, in a case where there are a plurality of embodiments, the present disclosure also includes configurations obtained by combining each embodiment.

First Embodiment (Movement Control System)

Figure 1:
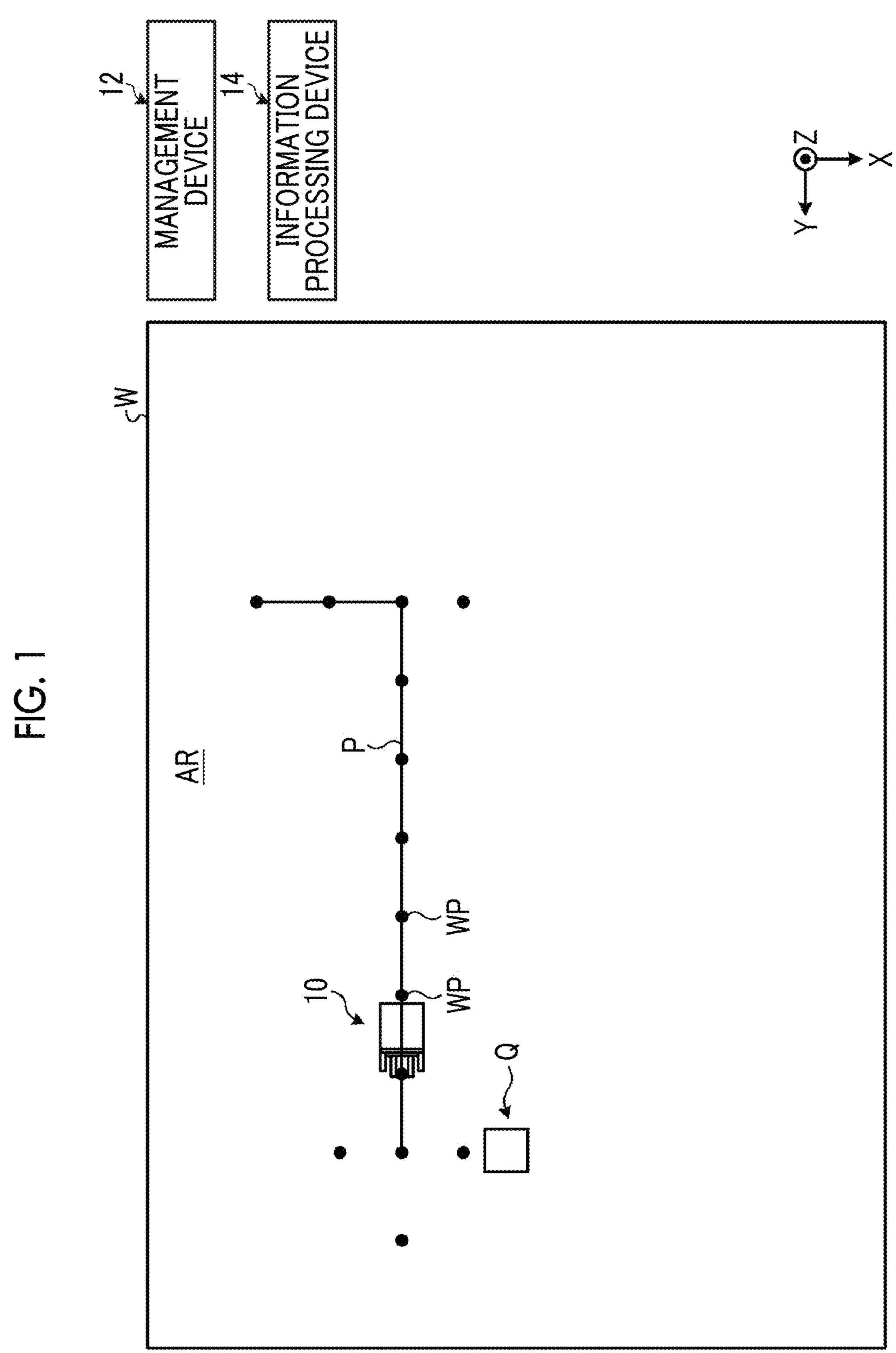
FIG. 1 is a schematic diagram of a movement control system according to the present embodiment.

FIG. 1 is a schematic diagram of a movement control system according to the present embodiment. As shown in FIG. 1, a movement control system 1 according to the present embodiment includes a moving body 10, a management device 12, and an information processing device 14. The movement control system 1 is a system that controls a movement of the moving body 10 belonging to a facility W. The facility W is, for example, a facility that is involved in physical distribution management, such as a warehouse. In the movement control system 1, the moving body 10 picks up and transports a target object Q disposed in a region AR of the facility W. The region AR is, for example, a floor surface of the facility W and is a region where the target object Q is installed or the moving body 10 moves. The target object Q is an object to be transported on which a cargo is loaded on a pallet in the present embodiment. However, the target object Q is not limited to a target object on which the cargo is loaded on the pallet, and may be in any form. For example, the target object Q may be only the cargo without the pallet.

Hereinafter, one direction along the region AR is referred to as an X direction, and a direction along the region AR and crossing a direction X is referred to as a Y direction. In the present embodiment, the Y direction is a direction orthogonal to the X direction. The X direction and the Y direction may be referred to as directions along a horizontal plane. In addition, a direction orthogonal to the X direction and the Y direction, more specifically, a direction toward an upper side in a vertical direction, is referred to as a Z direction. In addition, in the present embodiment, a "position" refers to a position (coordinates) in a coordinate system (coordinate system of the region AR) on a two-dimensional plane in the region AR, unless otherwise specified. In addition, a "posture" of the moving body 10 or the like is, unless otherwise specified, a direction of the moving body 10 or the like in the coordinate system of the region AR, and indicates a yaw angle (rotation angle) of the moving body 10 when the X direction is set to 0° when viewed from the Z direction.

(Waypoint)

The moving body 10 acquires information of a reference route P which is a route to be moved along, and moves along the reference route P. In the region AR, a waypoint WP is set for each position (coordinates), and the reference route P is set to connect the waypoints WP. That is, a route connecting the waypoints WP through which the moving body 10 is scheduled to pass is the reference route P. The waypoint WP is set according to a layout of the facility W.

(Moving Body)

Figure 2:
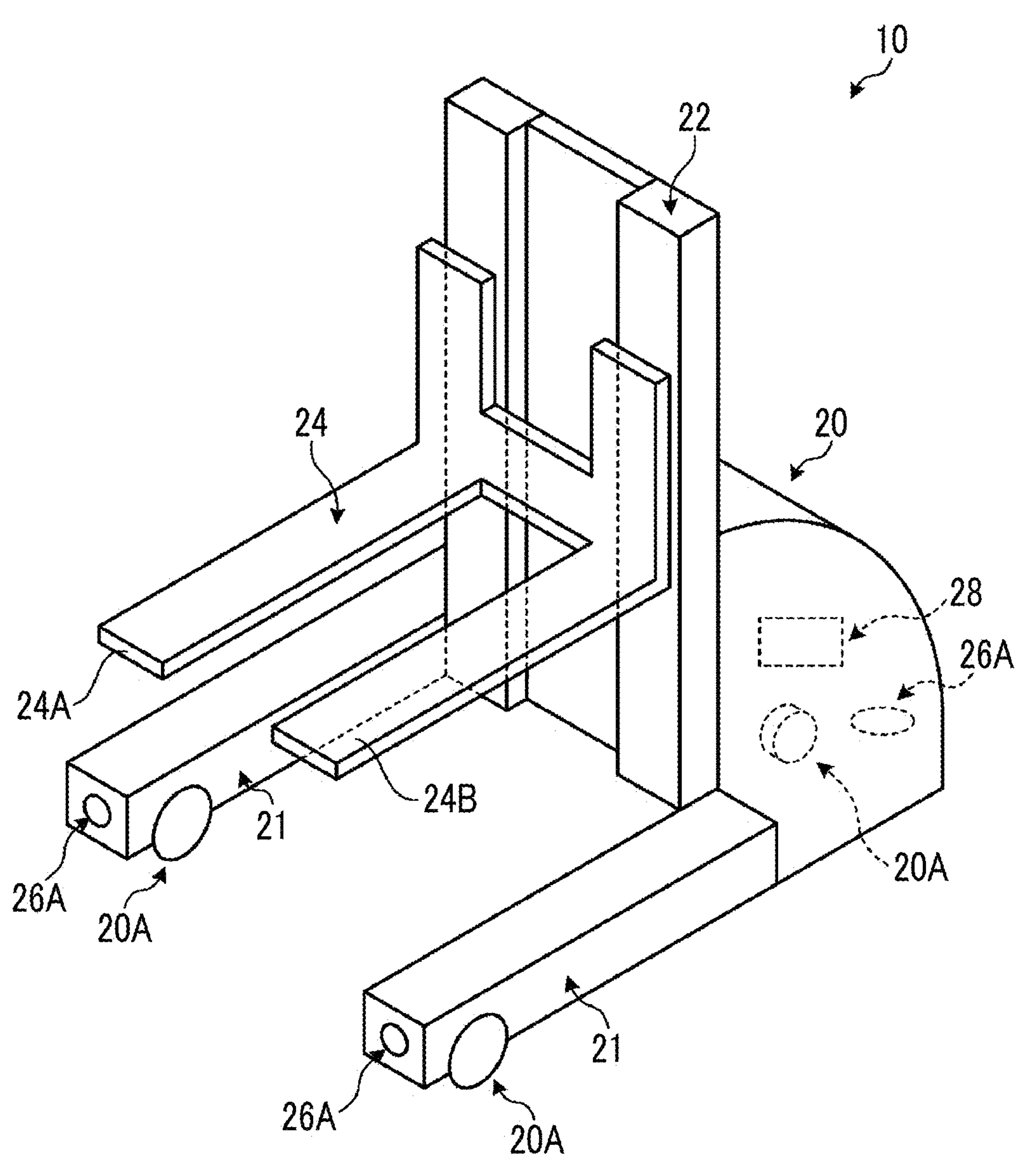
FIG. 2 is a schematic diagram of a configuration of a moving body.

FIG. 2 is a schematic diagram of a configuration of the moving body. The moving body 10 is a device that can automatically move and that can transport the target object Q. Additionally, in the present embodiment, the moving body 10 is a forklift, and more specifically, is a so-called automated guided vehicle (AGV) or an automated guided forklift (AGF). However, the moving body 10 is not limited to a forklift that transports the target object Q, and may be any device that can automatically move.

As shown in FIG. 2, the moving body 10 includes a vehicle body 20, wheels 20A, straddle legs 21, a mast 22, a fork 24, a sensor 26A, and a control device 28. The straddle legs 21 are a pair of shaft-shaped members provided at one end portion of the vehicle body 20 in a front-rear direction and protruding from the vehicle body 20. The wheels 20A are provided at a tip of each of the straddle legs 21 and on the vehicle body 20. That is, although a total of three wheels 20A are provided, positions and the number of wheels 20A may be optional. The mast 22 is attached to the straddle leg 21 to be movable and moves in the front-rear direction of the vehicle body 20. The mast 22 extends along an up-down direction (here, a direction Z) orthogonal to the front-rear direction. The fork 24 is attached to the mast 22 to be movable in the direction Z. The fork 24 may be movable in a lateral direction (direction crossing the up-down direction and the front-rear direction) of the vehicle body 20 with respect to the mast 22. The fork 24 has a pair of tabs 24A and 24B. The tabs 24A and 24B extend from the mast 22 toward a front direction of the vehicle body 20. The tab 24A and the tab 24B are disposed away from each other in a lateral direction of the mast 22. Hereinafter, in the front-rear direction, a direction on a side on which the fork 24 is provided in the moving body 10 is referred to as a front direction, and a direction on a side on which the fork 24 is not provided is referred to as a rear direction.

The sensor 26A detects at least one of a position and a posture of an object present around the vehicle body 20. It can also be said that the sensor 26A detects at least one of the position of the object with respect to the moving body 10 and the posture of the object with respect to the moving body 10. In the present embodiment, the sensor 26A is provided at the tip of each straddle leg 21 in the front direction and on a rear direction side of the vehicle body 20. However, a position where the sensor 26A is provided is not limited thereto, and the sensor 26A may be provided at any position, and the number of sensors 26A provided may be optional.

The sensor 26A is, for example, a sensor that emits laser light. The sensor 26A emits laser light while scanning in one direction (here, a lateral direction) and detects the position and a direction of the object from reflected light of the emitted laser light. That is, the sensor 26A can also be said to be so-called two-dimensional (2D) light detection and ranging (LiDAR). However, the sensor 26A is not limited to the above and may be a sensor that detects the object via any method, and, for example, may be a so-called three-dimensional (3D) LiDAR that scans in a plurality of directions, may be a so-called one-dimensional (1D) LiDAR that does not scan, or may be a camera.

The control device 28 controls the movement of the moving body 10. The control device 28 will be described below.

(Management Device)

Figure 3:
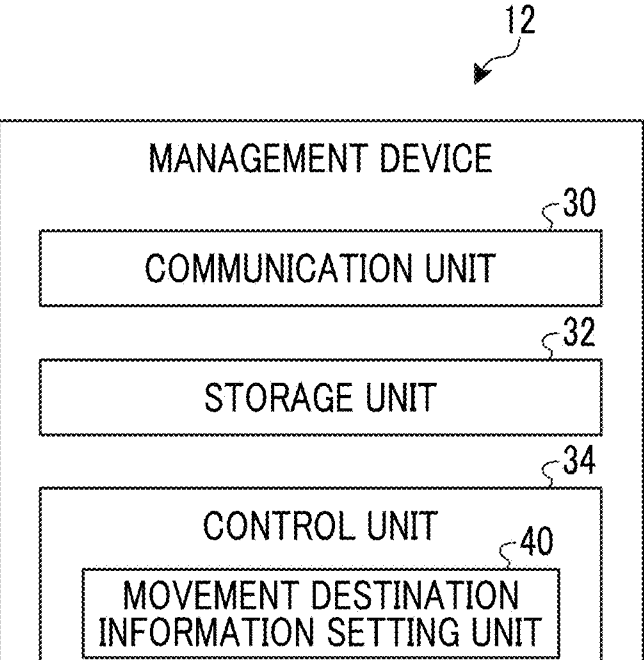
FIG. 3 is a schematic block diagram of a management device.

FIG. 3 is a schematic block diagram of the management device. The management device 12 is a system that manages physical distribution in the facility W. Although the management device 12 is a warehouse control system (WCS) or a warehouse management system (WMS) in the present embodiment, the management device 12 is not limited to the WCS and the WMS and may be any system, and may be, for example, a back end system such as other production management systems. A position where the management device 12 is provided is optional, and the management device 12 may be provided in the facility W or may be provided at a position away from the facility W to manage the facility W therefrom. The management device 12 is a computer, and as shown in FIG. 3, includes a communication unit 30, a storage unit 32, and a control unit 34.

The communication unit 30 is a module used for the control unit 34 and communicating with an external device such as the information processing device 14, and may include, for example, a Wi-Fi (registered trademark) module, an antenna, or the like. A communication method via the communication unit 30 is a wireless communication in the present embodiment, but the communication method may be optional. The storage unit 32 is a memory that stores various kinds of information, such as arithmetic contents of the control unit 34 and programs, and includes, for example, at least one of a main storage device such as a random-access memory (RAM) or a read-only memory (ROM) and an external storage device such as a hard disk drive (HDD).

The control unit 34 is an arithmetic device, and includes, for example, an arithmetic circuit such as a central processing unit (CPU). The control unit 34 includes a movement destination information setting unit 40. The control unit 34 reads out a program (software) from the storage unit 32 and executes the program to realize the movement destination information setting unit 40, and executes processing thereof. The control unit 34 may execute the processing with one CPU or may include a plurality of the CPUs and may execute the processing with the plurality of CPUs. In addition, the movement destination information setting unit 40 may be realized by a hardware circuit. In addition, a program for the control unit 34 stored in the storage unit 32 may be stored in a recording medium readable by the management device 12.

The movement destination information setting unit 40 sets movement destination information indicating a movement destination of the moving body 10. The setting of the movement destination information will be described later.

The management device 12 may execute processing other than processing of setting the movement destination information. For example, the management device 12 may also set information for controlling a mechanism (for example, an elevator, a door, or the like) other than the moving body 10 provided in the facility W.

(Information Processing Device)

Figure 4:
FIG. 4 is a schematic block diagram of an information processing device.
Figure 4:
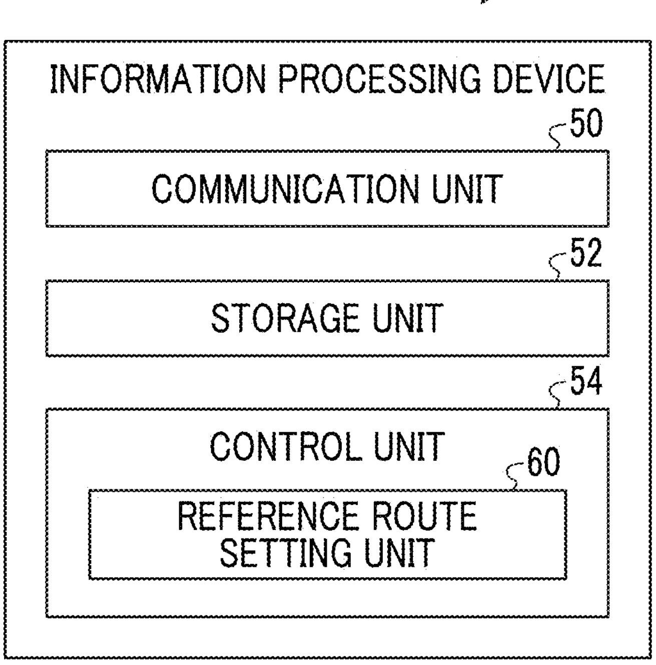

FIG. 4 is a schematic block diagram of the information processing device. The information processing device 14 is a device that is provided in the facility W and that processes information regarding the movement of the moving body 10, or the like. The information processing device 14 is, for example, a fleet control system (FCS), but is not limited thereto, and may be any device that processes the information regarding the movement of the moving body 10. The information processing device 14 is a computer, and as shown in FIG. 4, includes a communication unit 50, a storage unit 52, and a control unit 54. The communication unit 50 is a module used for the control unit 54 and communicating with an external device such as the management device 12 or the moving body 10, and may include, for example, an antenna, a Wi-Fi module, or the like. A communication method via the communication unit 50 is a wireless communication in the present embodiment, but the communication method may be optional. The storage unit 52 is a memory that stores various kinds of information, such as arithmetic contents of the control unit 54 and programs, and includes, for example, at least one of a main storage device such as a RAM or a ROM and an external storage device such as an HDD.

The control unit 54 is an arithmetic device, and includes, for example, an arithmetic circuit such as a CPU. The control unit 54 includes a reference route setting unit 60. The control unit 54 reads out a program (software) from the storage unit 52 and executes the program to realize the reference route setting unit 60, and executes processing thereof. The control unit 54 may execute the processing with one CPU or may include a plurality of the CPUs and may execute the processing with the plurality of CPUs. In addition, the reference route setting unit 60 may be realized by a hardware circuit. In addition, a program for the control unit 54 stored in the storage unit 52 may be stored in a recording medium readable by the information processing device 14.

The reference route setting unit 60 sets the reference route P of the moving body 10. A setting method of the reference route P will be described below.

In the present embodiment, the management device 12 and the information processing device 14 are separate devices, but may be integrated into one device. That is, the management device 12 may have at least some functions of the information processing device 14, and the information processing device 14 may have at least some functions of the management device 12.

(Control Device of Moving Body)

Figure 5:
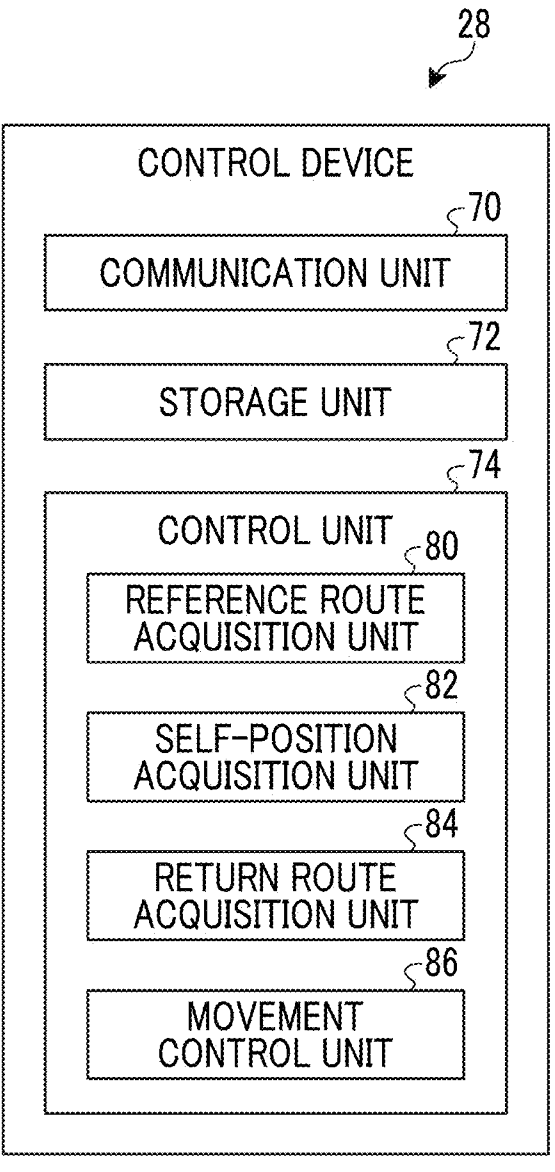
FIG. 5 is a schematic block diagram of a control device of the moving body.

Next, the control device 28 of the moving body 10 will be described. FIG. 5 is a schematic block diagram of the control device of the moving body. The control device 28 is a device that controls the moving body 10. The control device 28 is a computer, and as shown in FIG. 5, includes a communication unit 70, a storage unit 72, and a control unit 74. The communication unit 70 is a module used for the control unit 74 and communicating with an external device such as the information processing device 14, and may include, for example, an antenna, a Wi-Fi module, or the like. A communication method via the communication unit 70 is a wireless communication in the present embodiment, but the communication method may be optional. The storage unit 72 is a memory that stores various kinds of information, such as arithmetic contents of the control unit 74 and programs, and includes, for example, at least one of a main storage device such as a RAM or a ROM and an external storage device such as an HDD.

The control unit 74 is an arithmetic device, and includes, for example, an arithmetic circuit such as a CPU. The control unit 74 includes a reference route acquisition unit 80, a self-position acquisition unit 82, a return route acquisition unit 84, and a movement control unit 86. The control unit 74 reads out a program (software) from the storage unit 72 and executes the program to realize the reference route acquisition unit 80, the self-position acquisition unit 82, the return route acquisition unit 84, and the movement control unit 86, and executes processing thereof. The control unit 74 may execute the processing with one CPU or may include a plurality of the CPUs and may execute the processing with the plurality of CPUs. In addition, at least some of the reference route acquisition unit 80, the self-position acquisition unit 82, the return route acquisition unit 84, and the movement control unit 86 may be realized by a hardware circuit. In addition, a program for the control unit 74 stored in the storage unit 72 may be stored in a recording medium readable by the control device 28.

The reference route acquisition unit 80 acquires the information of the reference route P. The self-position acquisition unit 82 acquires position information of the moving body 10. The return route acquisition unit 84 determines whether or not the moving body 10 is positioned on the reference route P, and in a case where the moving body 10 is not positioned on the reference route P, the return route acquisition unit 84 acquires a return route PA for returning to the reference route P. The movement control unit 86 controls a movement mechanism of the moving body 10, such as a drive unit or steering, to control the movement of the moving body 10. Specific processing contents thereof will be described later.

(Processing of Movement Control System)

Processing contents of the movement control system 1 will be described below.

(Setting of Movement Destination Information)

The movement destination information setting unit 40 of the management device 12 sets the movement destination information indicating the movement destination of the moving body 10. The movement destination information setting unit 40 may designate a position (coordinates) of the movement destination itself as the movement destination information. In addition, an identifier is assigned to each of the waypoints WP, and the movement destination information setting unit 40 may designate an identifier of the waypoint WP corresponding to the movement destination as the movement destination information. The movement destination information setting unit 40 may set the movement destination information via any method. For example, the movement destination information setting unit 40 may acquire order information indicating the target object Q to be transported and a transport source and a transport destination and set the movement destination information based on the order information. The movement destination information setting unit 40 transmits the set movement destination information to the information processing device 14 via the communication unit 30.

(Setting of Reference Route)

The reference route setting unit 60 of the information processing device 14 sets the reference route P of the moving body 10. In the present embodiment, the reference route setting unit 60 sets the reference route P based on the movement destination information. The reference route setting unit 60 sets a route passing through each waypoint WP from a movement source to the movement destination as the reference route P. A position of the movement source may be optionally set, and, for example, the waypoint WP closest to a current position of the moving body 10 may be set as the movement source. The reference route P in FIG. 1 is a straight line trajectory connecting the waypoints WP for convenience of description. However, the reference route P is not limited to the straight line trajectory, and may be a trajectory including, for example, a straight line and a curved line. In this case, for example, the reference route setting unit 60 sets the route passing through each waypoint WP from an initial position to the movement destination as the reference route P, based on the movement destination information and map information of the facility W. In addition, for example, the reference route setting unit 60 may set the reference route P based on information of a vehicle specification of the moving body 10 in addition to the movement destination information and the map information of the facility W. The information of the vehicle specification is, for example, a specification that affects a route along which the moving body 10 can move, such as a size or a minimum turn radius of the moving body 10.

The reference route setting unit 60 transmits information of the set reference route P to the moving body 10. For example, the reference route setting unit 60 may transmit position information of each position on a trajectory of the reference route P to the moving body 10 as the information of the reference route P.

(Acquisition of Reference Route)

The reference route acquisition unit 80 of the moving body 10 acquires the information of the reference route P set by the information processing device 14.

(Return Route)

Figure 6:
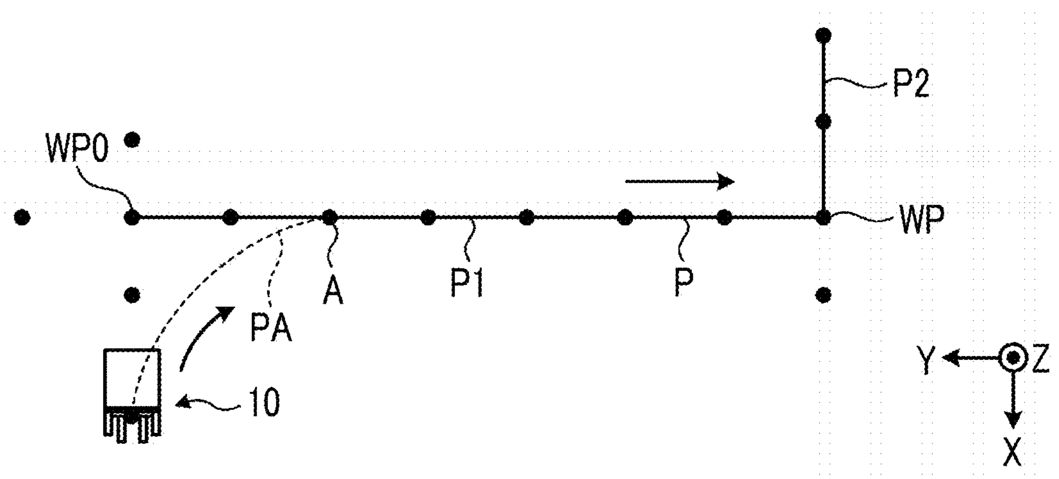
FIG. 6 is a schematic diagram for describing a return route.

FIG. 6 is a schematic diagram for describing the return route. The moving body 10 moves along the reference route P, but may be positioned at a place deviating from the reference route P, for example, as shown in FIG. 6. Various cases are assumed in which the moving body 10 is positioned at the place deviating from the reference route P. Examples thereof include a case in which the moving body 10 is waiting at a position deviating from the waypoint WP for charging or the like or a case in which the moving body 10 has picked up the target object Q at the position deviating from the waypoint WP. In a case where the moving body 10 is positioned at the place deviating from the reference route P in this way, there is a possibility that the moving body 10 cannot appropriately move along the reference route P. Meanwhile, in the present embodiment, in a case where the moving body 10 is positioned at the place deviating from the reference route P, the return route PA for returning the moving body 10 to the reference route P is set. In this manner, the moving body 10 can return to the reference route P through the return route PA. Therefore, according to the present embodiment, it is possible to appropriately move along the reference route P. Hereinafter, a setting of the return route PA will be specifically described.

(Acquisition of Position Information of Moving Body)

The self-position acquisition unit 82 of the moving body 10 acquires current position information of the moving body 10. Although an acquisition method of the position information of the moving body 10 is optional, for example, in the present embodiment, a detection body (not shown) is provided in the facility W, and the self-position acquisition unit 82 acquires information of a position and the posture of the moving body 10 based on detection of the detection body. Specifically, the moving body 10 emits laser light toward the detection body and receives reflected light of the laser light by the detection body to detect the position and the posture of the moving body 10 in the facility W. An acquisition method of the information of the position and the posture of the moving body 10 is not limited to the method using the detection body, and, for example, a method using simultaneous localization and mapping (SLAM) may be used.

(Determination of Whether or not Moving Body is on Reference Route)

The return route acquisition unit 84 of the moving body 10 determines whether or not the moving body 10 is positioned on the reference route P, based on the information of the reference route P and the position information of the moving body 10. For example, the return route acquisition unit 84 may determine that the moving body 10 is positioned on the reference route P in a case where the current position of the moving body 10 is on the reference route P, and may determine that the moving body 10 is not positioned on the reference route P in a case where the current position of the moving body 10 is not on the reference route P. In this case, the current position of the moving body 10 being on the reference route P is not limited to the current position of the moving body 10 exactly overlapping with the reference route P, and may indicate that the current position of the moving body 10 is within a predetermined distance range from the reference route P. The same may apply to other descriptions hereinafter.

The return route acquisition unit 84 does not acquire the return route PA in a case where the return route acquisition unit 84 determines that the moving body 10 is positioned on the reference route P. On the other hand, the return route acquisition unit 84 acquires the return route PA in a case where the return route acquisition unit 84 determines that the moving body 10 is not positioned on the reference route P. In the present embodiment, the return route acquisition unit 84 sets the return route PA based on the information of the reference route P in a case where the return route acquisition unit 84 determines that the moving body 10 is not positioned on the reference route P. Hereinafter, a setting method of the return route PA will be described.

(Setting of Return Route)

The return route acquisition unit 84 sets a route for reaching a merging position A on the reference route P as the return route PA. Specifically, the return route acquisition unit 84 selects the merging position A on the reference route P based on the information of the reference route P. The return route acquisition unit 84 sets a route along which the moving body 10 moving along the return route PA reaches the merging position A from the current position without interfering with an obstacle as the return route PA. Furthermore, the return route acquisition unit 84 sets the return route PA such that a traveling direction of the moving body 10 when the moving body 10 moves along the return route PA and reaches the merging position A coincides with a traveling direction of the reference route P at the merging position A. That is, in an example of FIG. 6, since the traveling direction of the reference route P at the merging position A is opposite to the Y direction, the return route acquisition unit 84 sets the return route PA, which is a trajectory on which the posture of the moving body 10 when the moving body 10 reaches the merging position A faces the direction opposite to the Y direction.

The return route acquisition unit 84 may select any position on the reference route P as the merging position A. For example, the return route acquisition unit 84 may select the waypoint WP passing through the reference route P as the merging position A.

Figure 7:
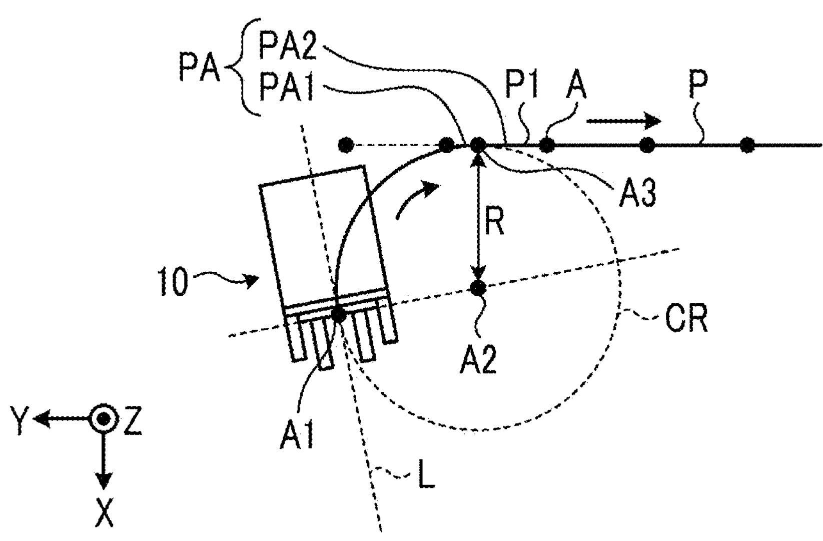
FIG. 7 is a schematic diagram for describing the return route.

FIG. 7 is a schematic diagram for describing the return route. The return route acquisition unit 84 may set any trajectory for reaching the merging position A as the return route PA. However, in the present embodiment, a route including at least one of a linear route PA2 and an arc route PA1 and for reaching the merging position A is set as the return route PA. The linear route PA2 is a linear route that approaches the merging position A (reference route P), and the arc route PA1 is an arc-shaped route that approaches the merging position A (reference route P).

For example, as shown in FIG. 7, the return route acquisition unit 84 sets a route passing through an arc of a circle CR having a radius (turn radius) R with a central position A2 as a center, as the arc route PA1. Specifically, the return route acquisition unit 84 sets a circle that is in contact with a straight line L passing through a reference position A1 of the moving body 10 and along a front-rear direction of the moving body 10 and a linear section P1 passing through the merging position A of the reference route P as the circle CR. The section P1 refers to a linear section passing through the merging position A on the reference route P. The return route acquisition unit 84 sets a section of the arc of the circle CR from the reference position A1 to a contact point A3 between the arc of the circle CR and the section P1 as the arc route PA1. Since the straight line L and the section P1 are determined by the position of the moving body 10 or the reference route P, the circle CR, in other words, the central position A2 and the radius R, can be uniquely set.

In an example of FIG. 7, the reference position A1 is the current position of the moving body 10. Therefore, the return route acquisition unit 84 sets a section from the current position of the moving body 10 to the contact point A3 as the arc route PA1. In addition, in the example of FIG. 7, since the contact point A3 does not overlap with the merging position A, the return route acquisition unit 84 sets a linear route from the contact point A3 to the merging position A as the linear route PA2. That is, in the example of FIG. 7, the return route acquisition unit 84 sets a route including the arc route PA1 from the current position of the moving body 10 to the contact point A3 and the linear route PA2 from the contact point A3 to the merging position A as the return route PA. Meanwhile, for example, in a case where the contact point A3 overlaps with the merging position A, the return route acquisition unit 84 may set the arc route PA1 from the current position of the moving body 10 to the merging position A (contact point A3) as the return route PA.

In addition, in the example of FIG. 7, the arc route PA1 is set with the current position of the moving body 10 as a starting point. However, the return route acquisition unit 84 may set the linear route PA2 with the current position of the moving body 10 as the starting point and set the arc route PA1 connected to the linear route PA2. In this case, for example, the return route acquisition unit 84 sets a linear route toward a direction approaching the reference route P through the straight line L from the current position of the moving body 10 as the linear route PA2. The return route acquisition unit 84 sets a route for reaching the contact point A3 from the reference position A1 along the arc of the circle CR with an end point of the linear route PA2 as the reference position A1, as the arc route PA1.

Figure 8:
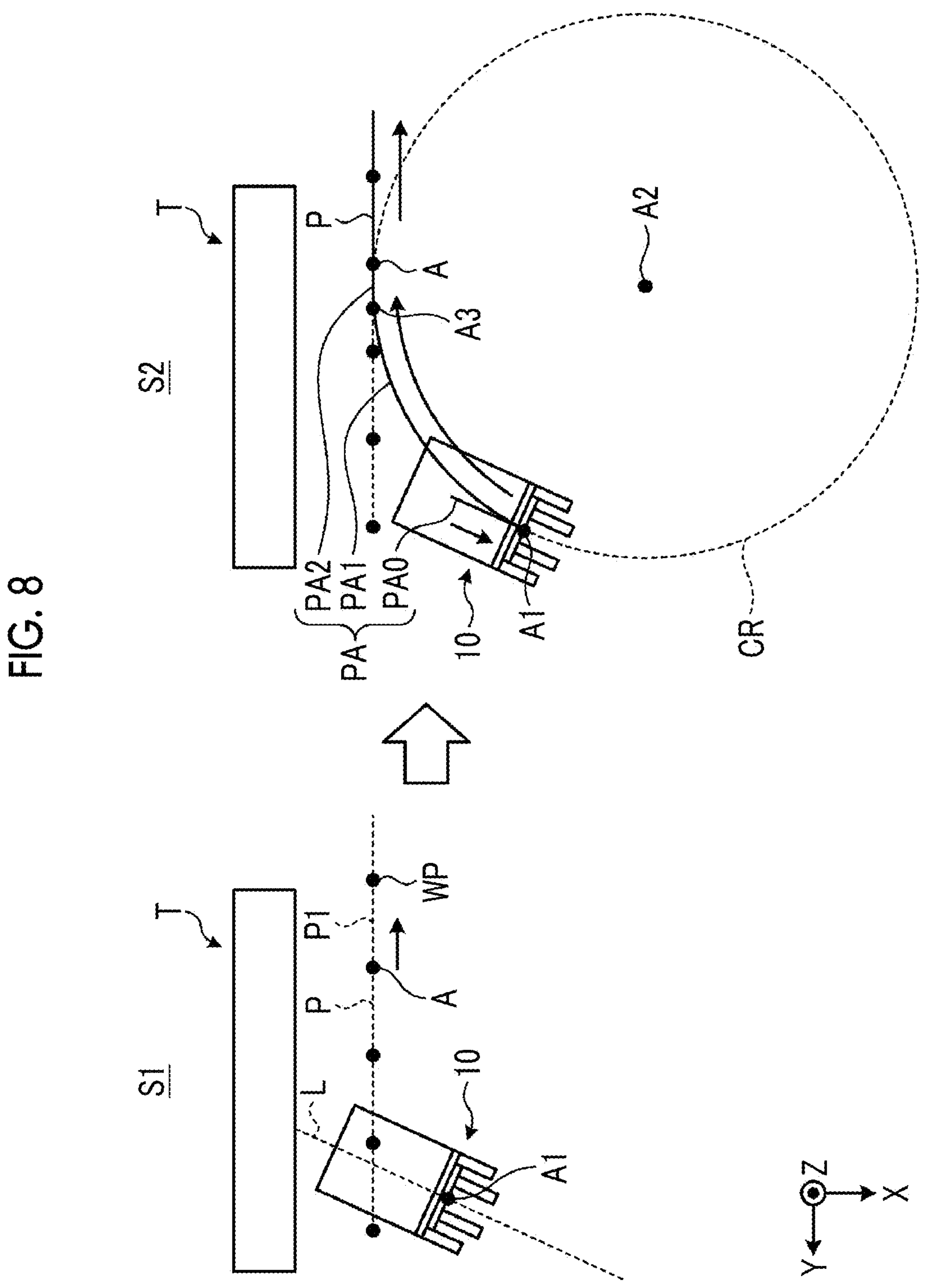
FIG. 8 is a schematic diagram for describing the return route.
Figure 9:
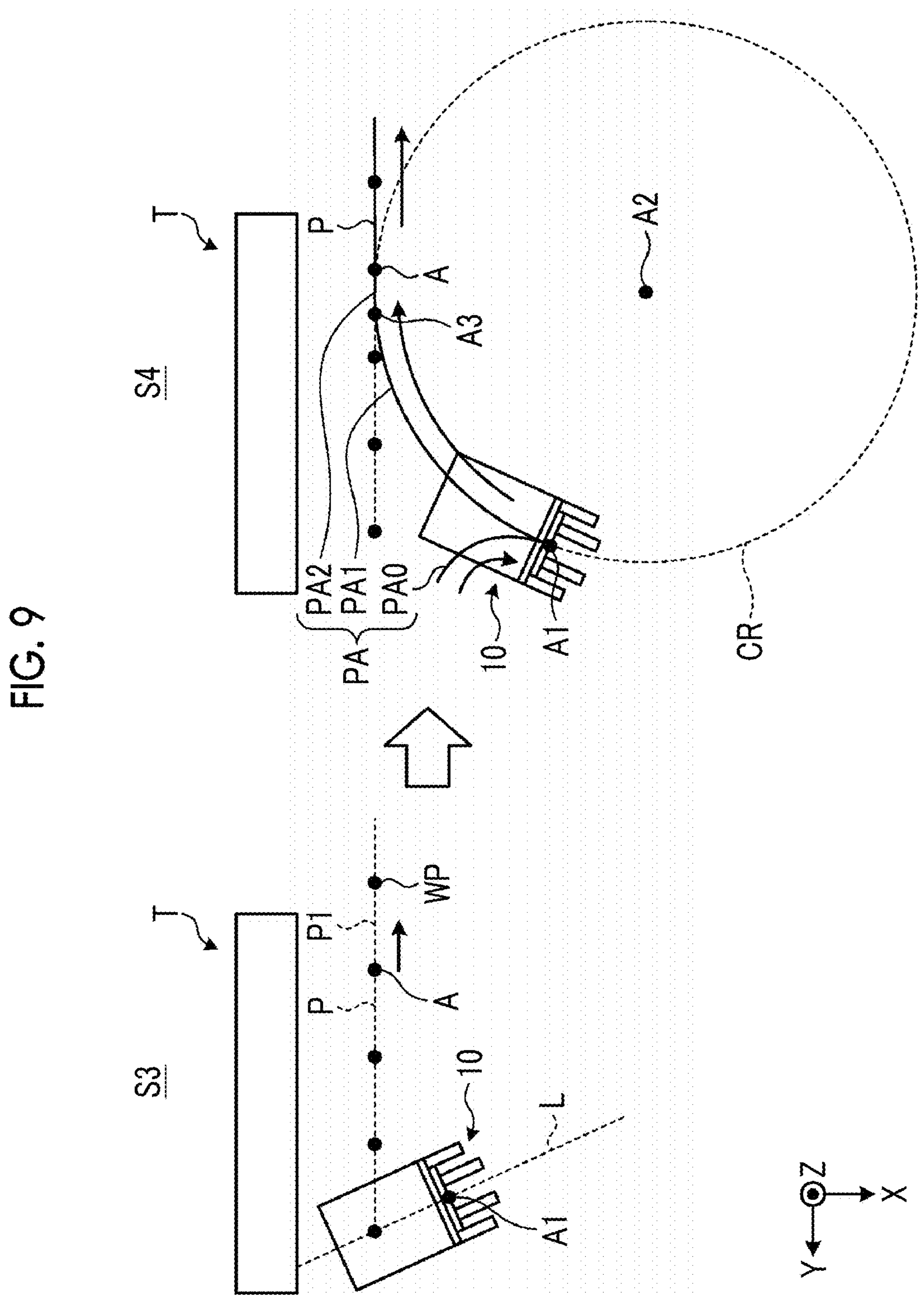
FIG. 9 is a schematic diagram for describing the return route.

FIGS. 8 and 9 are schematic diagrams for describing the return route. Here, in a case where the return route PA is set to include at least only one of the linear route PA2 and the arc route PA1, the moving body 10 may interfere with an obstacle T while moving along the return route PA. Therefore, the return route acquisition unit 84 preferably sets the return route PA to include a turning route PA0 in a case where the moving body 10 interferes with the obstacle T, on the return route PA including at least only one of the linear route PA2 and the arc route PA1. That is, the return route acquisition unit 84 preferably sets a route which includes the turning route PA0 and at least one of the linear route PA2 and the arc route PA1 and on which the moving body 10 does not interfere with the obstacle T as a return route PA. The turning route PA0 is a route that is connected to at least one of the linear route PA2 and the arc route PA1 and that is away from the merging position A (reference route P). A specific description will be made below.

As shown in FIG. 8, the return route acquisition unit 84 sets a linear route that is away from the merging position A (reference route P) as the turning route PA0 in a case where the moving body 10 faces a traveling direction side in the section P1 of the reference route P. A fact that the moving body 10 faces the traveling direction side in the section P1 of the reference route P means that a direction approaching the reference route P along the straight line L faces the traveling direction side in the section P1 of the reference route P. That is, in an example of step S1 in FIG. 8, a traveling direction in the section P1 of the reference route P is opposite to the Y direction, and a vector component on a Y-axis in the direction approaching the reference route P along the straight line L is in the direction opposite to the Y direction. Therefore, it can be said that the moving body 10 faces the traveling direction side in the section P1 of the reference route P. In this case, as shown in step S2 in FIG. 8, the return route acquisition unit 84 sets a linear route toward a direction away from the merging position A (reference route P) along the straight line L from the current position (reference position A1) of the moving body 10 as the turning route PA0. In this case, for example, the return route acquisition unit 84 sets a position of the contact point A3 and sets the turning route PA0 on which the arc route PA1 can reach the set contact point A3. That is, when the position of the contact point A3 is determined, an end point position of the turning route PA0 is also uniquely determined in addition to the radius R and the central position A2 of the arc route PA1. Therefore, the return route acquisition unit 84 can set the turning route PA0 based on the set position of the contact point A3. The return route acquisition unit 84 sets at least one of the linear route PA2 and the arc route PA1 from the end point position of the turning route PA0 via the same method as the above description, and sets the at least one of the linear route PA2 and the arc route PA1 as the return route PA. In an example of FIG. 8, a route on which the arc route PA1 and the linear route PA2 are arranged in this order from the end point position of the linear turning route PA0 is set as the return route PA.

As shown in FIG. 9, the return route acquisition unit 84 sets an arc-shaped route that is away from the merging position A (reference route P) as the turning route PA0 in a case where the moving body 10 faces a side opposite to the traveling direction in the section P1 of the reference route P. That is, in an example of step S3 in FIG. 9, the vector component on the Y-axis in the direction approaching the reference route P along the straight line L is in the Y direction. Therefore, it can be said that the moving body 10 faces the side opposite to the traveling direction in the section P1 of the reference route P. In this case, the return route acquisition unit 84 sets an arc-shaped route from the current position (reference position A1) of the moving body 10 to a predetermined end point position, which is away from the merging position A (reference route P) and on which the direction of the moving body 10 at an end point position faces the traveling direction side in the section P1 of the reference route P, as the turning route PA0. In this case, a radius (turn radius) and a central position of an arc, and coordinates of the end point position on the turning route PA0 may be appropriately set. In the present embodiment, the return route acquisition unit 84 sets the position of the contact point A3 and sets the turning route PA0 on which the arc route PA1 can reach the set contact point A3. That is, when the position of the contact point A3 is determined, an end point position of the turning route PA0 is also uniquely determined in addition to the radius R and the central position A2 of the arc route PA1. Therefore, the return route acquisition unit 84 can set the turning route PA0 based on the set position of the contact point A3. The return route acquisition unit 84 sets at least one of the linear route PA2 and the arc route PA1 from the end point position of the turning route PA0 via the same method as the above description, and sets the at least one of the linear route PA2 and the arc route PA1 as the return route PA. In the example of FIG. 8, a route on which the arc route PA1 and the linear route PA2 are arranged in this order from the end point position of the arc-shaped turning route PA0 is set as the return route PA.

In the above description, the return route acquisition unit 84 sets the return route PA including the turning route PA0 in a case where the interference with the obstacle T occurs, on the return route PA (return route PA not including the turning route PA0) including at least only one of the linear route PA2 and the arc route PA1. However, a condition for setting the return route PA including the turning route PA0 is not limited thereto. For example, the return route acquisition unit 84 may set the return route PA including the turning route PA0 in a case where the return route acquisition unit 84 determines that it is not possible to move along the return route PA not including the turning route PA0. A reference for determining that it is not possible to move along the return route PA not including the turning route PA0 may be optional. For example, when the radius R of the arc route PA1 is smaller than a preset threshold value (for example, a minimum turn radius within which the moving body 10 can move), a movement may be determined to be impossible.

(Mitigation of Return Route)

The return route acquisition unit 84 may mitigate the return route PA set as described above. The mitigation refers to processing of reducing a displacement of a direction of a trajectory of the return route PA, in other words, processing of reducing a degree of change in a steering angle of the moving body 10 in a case where the moving body 10 moves along the return route PA. For example, the return route acquisition unit 84 may convert at least a part of a section of the return route PA into a Bezier curve to mitigate the return route PA. The return route acquisition unit 84 mitigates the return route PA under a condition where a starting point position is maintained at the current position of the moving body 10 and an end point position is maintained at the merging position A. By mitigating the return route PA in this way, the degree of change in the steering angle of the moving body 10 can be reduced, and a load or the like on the wheels can be reduced.

(Selection of Merging Position From Among Plurality of Candidate Positions)

In the present embodiment, the return route acquisition unit 84 selects the merging position A from among a plurality of candidate positions on the reference route P, and sets the return route PA to the selected merging position A. The candidate position may be any position on the reference route P. For example, when a linear section passing through the waypoint WP (in the example of FIG. 6, a waypoint WP1) on the reference route P that is closest to the current position of the moving body 10, among the reference routes P, is set as the section P1, the return route acquisition unit 84 may set the waypoint WP on the section P1 as the candidate position. That is, it can be said that the return route acquisition unit 84 may select the merging position A from the section P1 which is a linear section nearest to the moving body 10 without selecting the merging position A from a section P2 crossing from the section P1.

More specifically, the return route acquisition unit 84 sets a candidate route to the candidate position for each candidate position. The return route acquisition unit 84 selects the return route PA from each of the candidate routes. In other words, it can be said that the return route acquisition unit 84 selects the candidate position used for setting the candidate route selected as the return route PA, as the merging position A. A setting method of a candidate route is the same as the setting method of the return route PA described above except that the candidate position is treated as the merging position A.

The return route acquisition unit 84 determines, for each candidate route, whether or not the interference with the obstacle T occurs in a case where the moving body 10 moves along the candidate route, and selects a candidate route that does not interfere with the obstacle T as the return route PA. The obstacle T here is an object that is installed in the facility W in advance, and refers to an object that can be recognized in advance from, for example, the map information. The return route acquisition unit 84 determines whether or not the interference with the obstacle T occurs in a case where the moving body 10 moves along the candidate route, based on a position of the obstacle T shown in the map information and a position of the candidate route. For example, the return route acquisition unit 84 may determine that the interference with the obstacle T occurs in a case where the moving body 10 moves along the candidate route in a case where the position of the obstacle T shown in the map information is within a predetermined distance range from the candidate route, and may determine that the interference with the obstacle T does not occur in a case where the moving body 10 moves along the candidate route in a case where the position of the obstacle T is outside the predetermined distance range from the candidate route. A predetermined distance here may be set optionally, for example, from a vehicle width of the moving body 10. In addition, the determination of whether or not the interference occurs may be made by using the same method as in other descriptions of the present embodiment.

In a case where there are a plurality of the candidate routes that do not interfere with the obstacle T, the return route acquisition unit 84 may select any candidate route among the plurality of candidate routes that do not interfere with the obstacle T as the return route PA. For example, the return route acquisition unit 84 may select, as the return route PA, a candidate route in which a turn radius (radius R) of the arc route PA1 is at its maximum from among the plurality of candidate routes that do not interfere with the obstacle T.

Furthermore, in the present embodiment, the return route acquisition unit 84 sets a route (route not including the turning route PA0) including at least only one of the linear route PA2 and the arc route PA1 as the candidate route. In a case where there is no candidate route that does not interfere with the obstacle T among the candidate routes that do not include the turning route PA0, the return route acquisition unit 84 sets the candidate route for each candidate position to include the turning route PA0. That is, in this case, the return route acquisition unit 84 sets a candidate route including the turning route PA0 and including at least one of the linear route PA2 and the arc route PA1, for each candidate position. The return route acquisition unit 84 determines, for each candidate route including the turning route PA0, whether or not the interference with the obstacle T occurs in a case where the moving body 10 moves along the candidate route, and selects the candidate route that does not interfere with the obstacle T as the return route PA.

Even in a case where there are the plurality of candidate routes that do not interfere with the obstacle T among the candidate routes including the turning route PA0, any candidate route among the plurality of candidate routes may be selected as the return route PA. For example, the return route acquisition unit 84 may select, as the return route PA, a candidate route in which a turn radius (radius R) of the arc route PA1 is at its maximum from among the plurality of candidate routes that do not interfere with the obstacle T. Meanwhile, in a case where there is no candidate route that does not interfere with the obstacle T among the candidate routes including the turning route PA0, the candidate route may be set again by making a trajectory of the turning route PA0 different, and the setting of the candidate route may be repeated until there is a candidate route that does not interfere with the obstacle T. For example, in this case, the return route acquisition unit 84 may set the position of the contact point A3 to a different position to make the trajectory of the turning route PA0 different.

(Movement of Moving Body)

The movement control unit 86 of the moving body 10 moves the moving body 10 along the reference route P in a case where the current position of the moving body 10 is on the reference route P. On the other hand, in a case where the current position of the moving body 10 is not on the reference route P, the movement control unit 86 moves the moving body 10 along the return route PA set by the return route acquisition unit 84, and in a case where the moving body 10 reaches the merging position A, the movement control unit 86 switches a route to the reference route P and moves the moving body 10 along the reference route P. The moving body 10 moves on the return route PA or on the reference route P by sequentially ascertaining the position and the posture of the moving body 10 via the self-position acquisition unit 82.

(Processing Flow)

Figure 10:
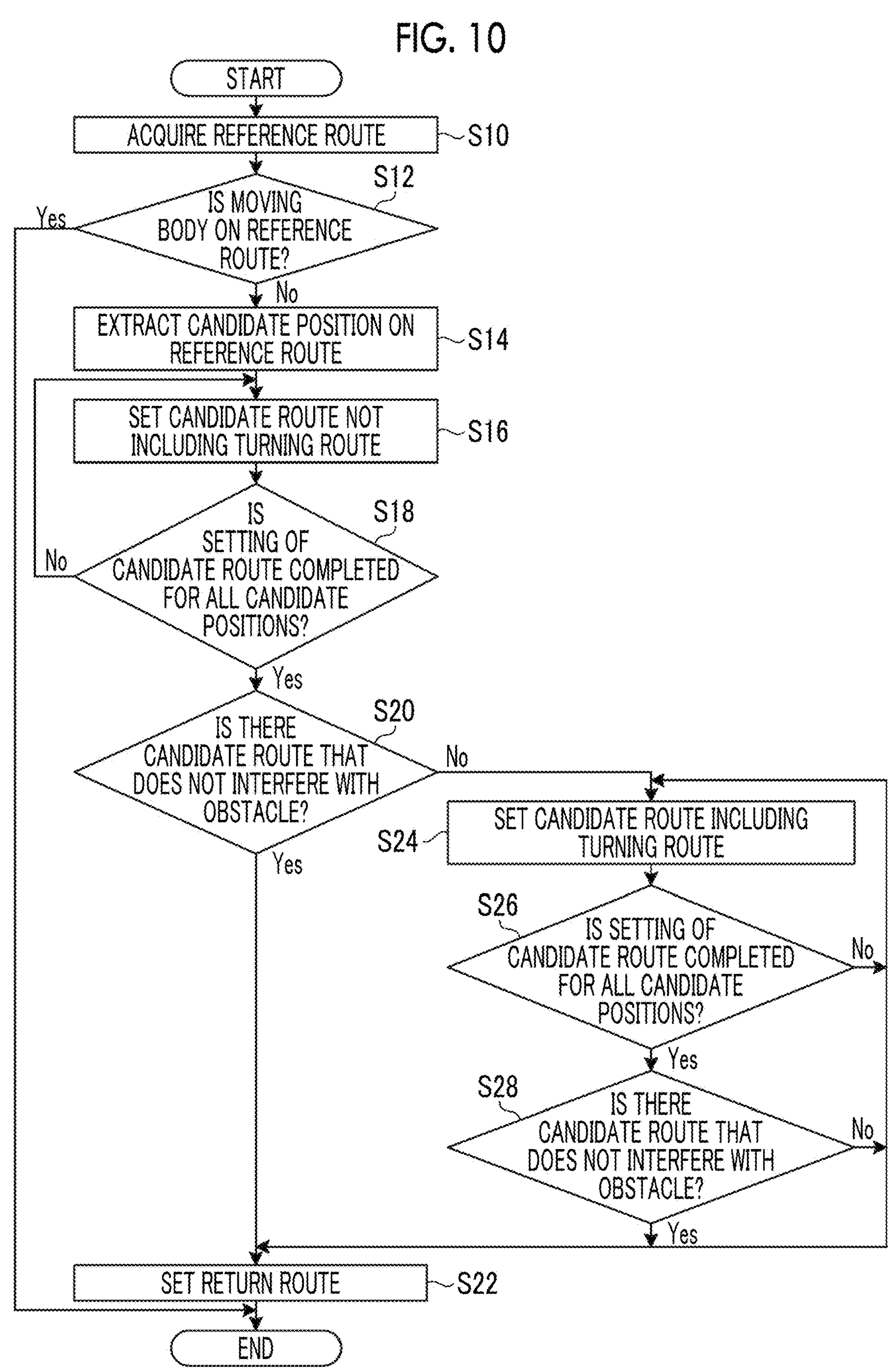
FIG. 10 is a flowchart showing a processing flow for setting the return route.

A processing flow for setting the return route PA described above will be described. FIG. 10 is a flowchart showing a processing flow for setting the return route. As shown in FIG. 10, the moving body 10 acquires the information of the reference route P via the reference route acquisition unit 80 (step S10), and determines whether or not the moving body 10 is positioned on the reference route P via the return route acquisition unit 84, based on the information of the reference route P and the current position of the moving body 10 (step S12). In a case where the moving body 10 is positioned on the reference route P (step S12: Yes), processing ends without setting the return route PA, and the moving body 10 moves along the reference route P. When the moving body 10 is not positioned on the reference route P (step S12: No), the return route acquisition unit 84 extracts the candidate position on the reference route P (step S14), and sets a candidate route for reaching the candidate position without including the turning route PA0 (step S16). Thereafter, when the setting of the candidate route not including the turning route PA0 is not completed for all the candidate positions (step S18: No), the processing returns to step S16, and the candidate route for another candidate position is set. On the other hand, in a case where the setting of the candidate route not including the turning route PA0 is completed for all the candidate positions (step S18: Yes), the return route acquisition unit 84 determines whether or not there is a candidate route that does not interfere with the obstacle T among the candidate routes not including the turning route PA0 (step S20). In a case where there is a candidate route that does not interfere with the obstacle T (step S20: Yes), the candidate route that does not interfere with the obstacle T is set as the return route PA (step S22).

Meanwhile, in a case where there is no candidate route that does not interfere with the obstacle T among the candidate routes not including the turning route PA0 (step S20: No), the return route acquisition unit 84 sets a candidate route including the turning route PA0 and for reaching the candidate position (step S24). Thereafter, when the setting of the candidate route including the turning route PA0 is not completed for all the candidate positions (step S26: No), the processing returns to step S24, and the candidate route for another candidate position is set. On the other hand, in a case where the setting of the candidate route including the turning route PA0 is completed for all the candidate positions (step S26: Yes), the return route acquisition unit 84 determines whether or not there is a candidate route that does not interfere with the obstacle T among the candidate routes including the turning route PA0 (step S28). In a case where there is a candidate route that does not interfere with the obstacle T (step S28: Yes), the candidate route that does not interfere with the obstacle T is set as the return route PA (step S22). In a case where there is no candidate route that does not interfere with the obstacle T, the processing returns to step S24, and the candidate route is set again by making an arc trajectory of the turning route PA0 (for example, at least one of the turn radius, the central position, and the end point position) different.

Effects

As described above, the moving body 10 according to the present embodiment sets the return route PA to the merging position A on the reference route P in a case where the moving body 10 is not positioned on the reference route P. Therefore, the moving body 10 can reach the merging position A through the return route PA, and thus the moving body 10 can appropriately move along the reference route P from the merging position A. Furthermore, in the present embodiment, the return route PA is set not to interfere with the obstacle T. Therefore, it is possible to return to the reference route P without interfering with the obstacle T. In addition, in the present embodiment, the return route PA is selected from among the plurality of candidate routes. Therefore, an appropriate return route PA for being capable of returning to the reference route P can be selected, and it is possible to appropriately move along the reference route P.

In the above description, the moving body 10 sets the return route PA via the return route acquisition unit 84. However, the entity that sets the return route PA is not limited to the moving body 10. For example, the return route PA may be set by the information processing device 14. In this case, the information processing device 14 acquires information of the current position of the moving body 10 from the moving body 10, determines whether or not the moving body 10 is positioned on the reference route P, and sets the return route PA to the merging position A in a case where the moving body 10 is not positioned on the reference route P. In this case, the moving body 10 acquires information of the return route PA set by the information processing device 14 from the information processing device 14.

Second Embodiment

Next, a second embodiment will be described. The second embodiment is different from the first embodiment in that the arc route PA1 of the return route PA is set by a binary search. In the second embodiment, description of the parts with a configuration common to the first embodiment will not be repeated.

Figure 11:
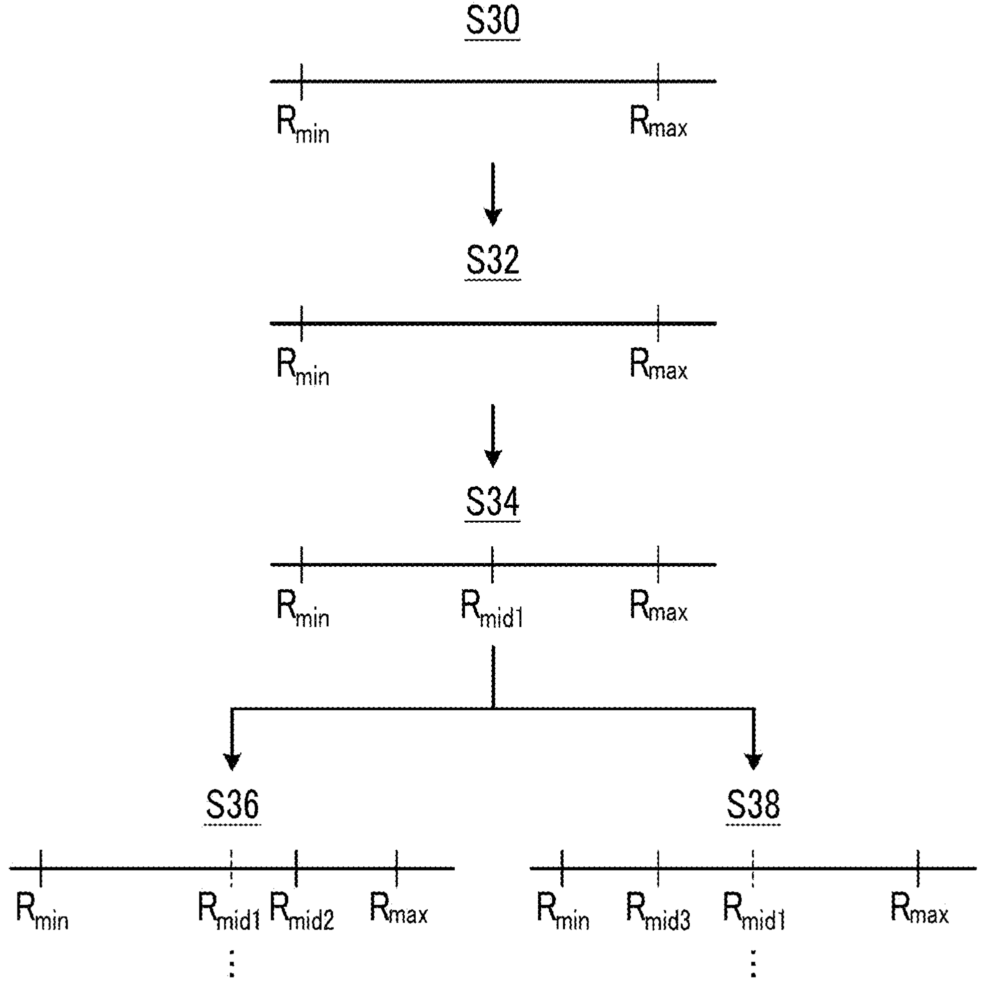
FIG. 11 is a schematic diagram for describing a setting of an arc route according to a second embodiment.

FIG. 11 is a schematic diagram for describing a setting of an arc route according to the second embodiment. In the first embodiment, the arc route PA1 is set by using the circle CR that is in contact with the straight line L and the section P1. Therefore, the central position A2 and the radius R of the circle CR are uniquely set. Meanwhile, the return route acquisition unit 84 according to the second embodiment sets the radius R (turn radius) of the arc route PA1 via the binary search in which a minimum turn radius $R_{min}$ set in advance is set as a minimum value and a maximum turn radius $R_{max}$ set in advance is set as a maximum value. That is, the return route acquisition unit 84 searches for a circle (radius and central position) in which a radius is at its maximum via the binary search among circles in which an arc passes through the reference position A1 and through a position on the section P1, in which a radius is equal to or greater than the minimum turn radius $R_{min}$ and equal to or smaller than the maximum turn radius $R_{max}$, and which do not interfere with the obstacle T, and sets the circle as the circle CR. The return route acquisition unit 84 sets a section of the arc of the circle CR from the reference position A1 to the position on the section P1 as the arc route PA1. The minimum turn radius $R_{min}$ and the maximum turn radius $R_{max}$ may be appropriately set, and, for example, the minimum turn radius $R_{min}$ may be determined from vehicle body dimensions, and the maximum turn radius $R_{max}$ may be determined from the turn radius allowable when turning a curve.

An example of a setting method of the circle CR by using the binary search will be specifically described. For example, as shown in step S30 of FIG. 11, the return route acquisition unit 84 determines whether or not a circle which passes through the reference position A1 and through the position on the section P1 and in which a radius is the minimum turn radius $R_{min}$ can be set. When the circle can be set, as shown in step S32, the return route acquisition unit 84 determines whether or not a circle which passes through the reference position A1 and through the position on the section P1 and in which a radius is the maximum turn radius $R_{max}$ can be set. In a case where the circle which passes through the reference position A1 and through the position on the section P1 and in which the radius is the maximum turn radius $R_{max}$ can be set, the return route acquisition unit 84 sets the circle as the circle CR. Meanwhile, in a case where the circle which passes through the reference position A1 and through the position on the section P1 and in which the radius is the maximum turn radius $R_{max}$ cannot be set, as shown in step S34, the return route acquisition unit 84 determines whether or not a circle which passes through the reference position A1 and through the position on the section P1 and in which a radius is a value $R_{mid1}$, which is a value between the minimum turn radius $R_{min}$ and the maximum turn radius $R_{max}$ (more preferably, an average value thereof), can be set. In a case where the circle which passes through the reference position A1 and through the position on the section P1 and in which the radius is the value $R_{mid1}$ can be set, as shown in step S36, the return route acquisition unit 84 determines whether or not a circle which passes through the reference position A1 and through the position on the section P1 and in which a radius is a value $R_{mid2}$, which is a value between the value $R_{mid1}$ and the maximum turn radius $R_{max}$ (more preferably, an average value thereof), can be set. On the other hand, in a case where the circle which passes through the reference position A1 and through the position on the section P1 and in which the radius is the value $R_{mid1}$ cannot be set, as shown in step S38, the return route acquisition unit 84 determines whether or not a circle which passes through the reference position A1 and through the position on the section P1 and in which a radius is a value $R_{mid3}$, which is a value between the minimum turn radius $R_{min}$ and the value $R_{mid1}$ (more preferably, an average value thereof), can be set. The return route acquisition unit 84 repeats this processing to search for a circle in which a radius is at its maximum among circles which pass through the reference position A1 and through the position on the section P1 and in which a radius is equal to or greater than the minimum turn radius $R_{min}$ and equal to or smaller than the maximum turn radius $R_{max}$, and sets the circle as the circle CR for setting the arc route PA1.

As described above, in the second embodiment, the circle CR is set by using the binary search without uniquely determining the circle CR by using the straight line L and the section P1. Therefore, the arc route PA1 can be appropriately set while reducing an arithmetic load.

Third Embodiment

Next, a third embodiment will be described. The third embodiment is different from the first embodiment in that the return route PA is set based on an approach route for approaching the target object Q in a case where the moving body 10 deviates from the reference route P because the moving body 10 has moved along the approach route. In the third embodiment, description of the parts with a configuration common to the first embodiment will not be repeated.

Figure 12:
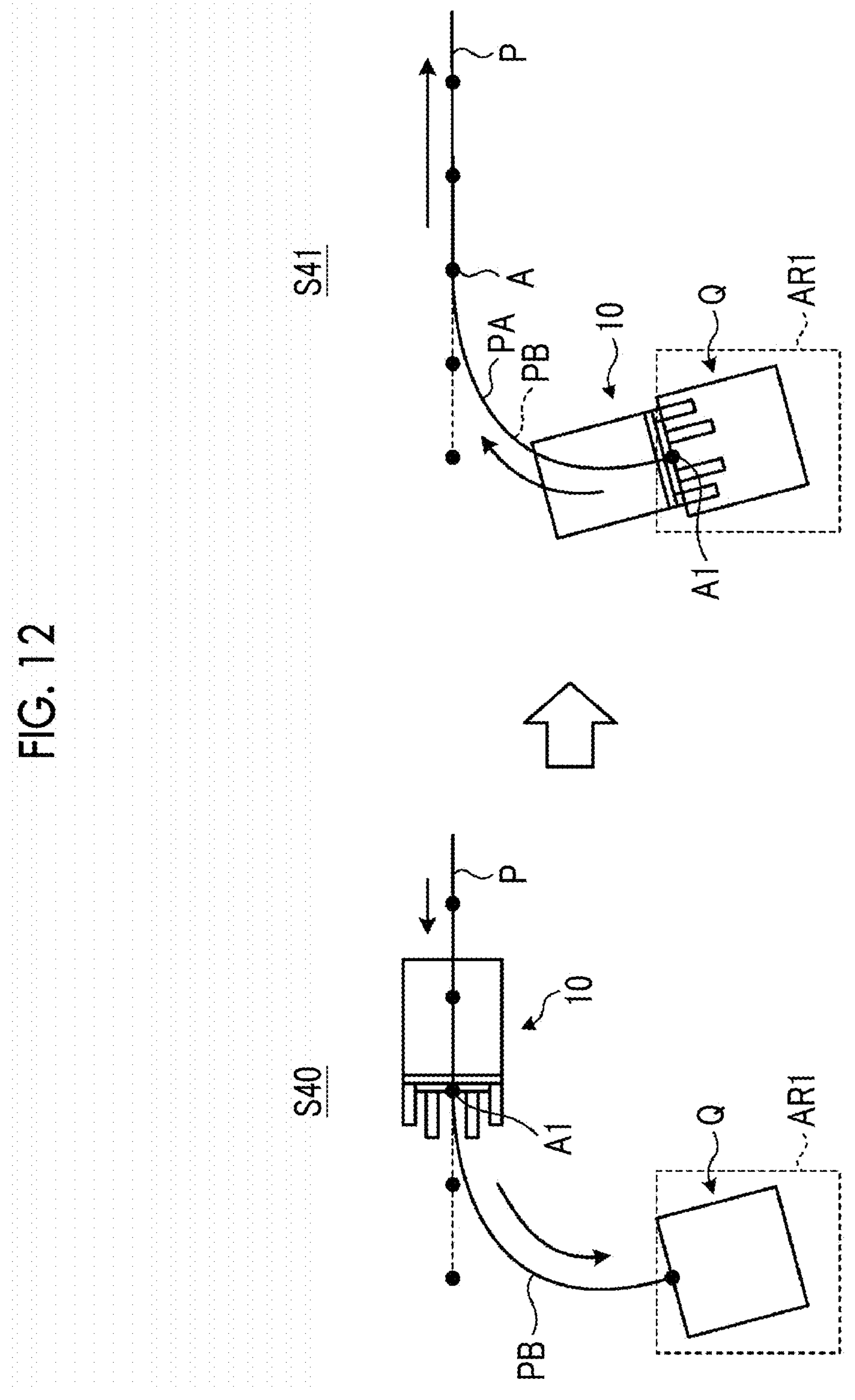
FIG. 12 is a schematic diagram showing an example of a case where the return route is set based on an approach route.

FIG. 12 is a schematic diagram showing an example of a case where the return route is set based on the approach route. As in step S40 of FIG. 12, the moving body 10 switches a route from the reference route P to an approach route PB, moves along the approach route PB, approaches the target object Q installed in an installation region AR1, and picks up the target object Q. Since the installation region AR1 is at a position deviating from the reference route P, the moving body 10 that moves along the approach route PB to pick up the target object Q is positioned at the place deviating from the reference route P. The installation region AR1 is a region that is set in advance as a region for disposing the target object Q. In addition, the approach route PB is a route from the reference route P toward the target object Q, and may be set by any method. For example, the approach route PB may be set in advance as a route from a position on the reference route P toward the installation region AR1, based on position information of the reference route P and position information of the installation region AR1. In addition, for example, the moving body 10 may set the approach route PB from the position on the reference route P toward the target object Q, based on a position and a posture of the target object Q. In this case, the movement control unit 86 may cause a sensor (for example, the sensor 26A) provided in the moving body 10 to detect the position and the posture of the target object Q, and set a route on which a predetermined position and posture (a position and a posture where the moving body 10 can pick up the target object Q) are taken with respect to the detected position and posture of the target object Q as the approach route PB.

In the third embodiment, the self-position acquisition unit 82 of the moving body 10 acquires the current position of the moving body 10, for example, at a position where the target object Q is picked up. The position where the target object Q is picked up deviates from the reference route P, and thus the return route acquisition unit 84 determines that the moving body 10 is not positioned on the reference route P. More specifically, the return route acquisition unit 84 also acquires information indicating that a movement is made along the approach route PB, and determines that a deviation occurs from the reference route P due to the movement along the approach route PB. In this case, as shown in step S41 of FIG. 12, the return route acquisition unit 84 sets the return route PA to the merging position A based on the approach route PB. For example, the return route acquisition unit 84 may set a route which is along the approach route PB and on which a traveling direction is opposite to that of the approach route PB as the return route PA. In addition, for example, the return route acquisition unit 84 may mitigate the approach route PB and set a route which passes through the mitigated approach route PB and on which a traveling direction is opposite to that of the approach route PB as the return route PA. The approach route PB may have a complicated trajectory in order to pick up the target object Q. However, the return route PA for returning to the reference route P does not need to have a complicated trajectory. Therefore, the approach route PB is mitigated, so that the load on the wheels can be reduced.

As described above, in the third embodiment, the return route PA is set based on the approach route PB. An arithmetic load of the return route PA can be reduced by using the approach route PB set in advance as in the third embodiment.

Fourth Embodiment

Next, a fourth embodiment will be described. The fourth embodiment is different from the first embodiment in that in a case where a plurality of the reference routes P are set, the return route PA is set for each of the plurality of reference routes P and the reference route P actually used is selected based on each return route PA. In the fourth embodiment, description of the parts with a configuration common to the first embodiment will not be repeated. The fourth embodiment can also be applied to the second embodiment and the third embodiment.

Figure 13:
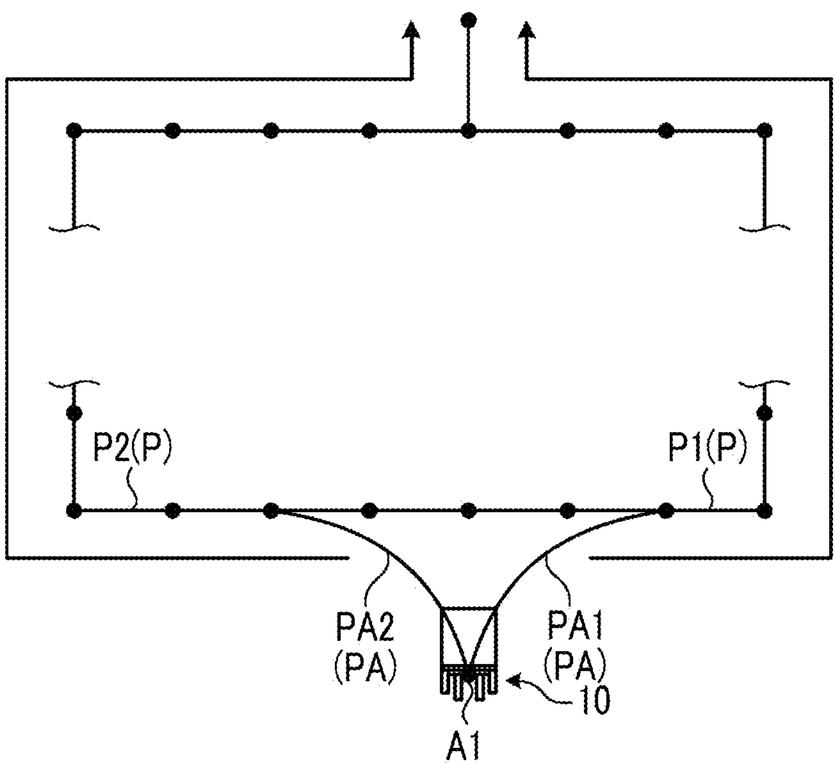
FIG. 13 is a schematic diagram showing an example of a case where a plurality of reference routes are set.

FIG. 13 is a schematic diagram showing an example of a case where a plurality of reference routes are set. In the fourth embodiment, the reference route setting unit 60 of the information processing device 14 sets the plurality of reference routes P. In this case, for example, the reference route setting unit 60 may set the plurality of reference routes P having the same target positions but different routes. For example, in an example of FIG. 13, the reference route setting unit 60 sets reference routes P1 and P2 having the same target positions but different routes. However, each of the reference routes P may have a different target position, and the number of the set reference routes P is not limited to two and may be three or more.

The reference route acquisition unit 80 of the moving body 10 acquires information of the plurality of reference routes P. A return route setting unit 84 determines whether or not the moving body 10 is positioned on the reference route P for each of the reference routes P. The return route setting unit 84 sets the return route PA for each of the reference routes P in a case where the moving body 10 is not positioned on each reference route P. That is, the return route setting unit 84 sets the return route PA for each reference route P. The setting method of the return route PA may be the same as that of the first embodiment.

The return route setting unit 84 selects the reference route P to be used for the movement of the moving body 10 from among each of the reference routes P, based on each of the return routes PA (return route PA for each reference route P). The return route setting unit 84 selects the return route PA set for the selected reference route P, and the moving body 10 moves along the selected return route PA and along the selected reference route P. In this case, for example, the moving body 10 may transmit information of the selected reference route P to the information processing device 14, and when the moving body 10 receives a command permitting the movement along the reference route P from the information processing device 14, the moving body 10 may move along the selected return route PA and along the selected reference route P.

The return route setting unit 84 may select the reference route P from among each of the reference routes P via any method. For example, the return route setting unit 84 may calculate the time required for reaching the target position, based on the reference route P and the return route PA set with respect to the reference route P, and may select, from among the reference routes P and the return routes PA, the reference route P and return route PA on which the time required for reaching the target position is the shortest.

As described above, in the fourth embodiment, in a case where the plurality of reference routes P are set, the return route PA is set for each of the reference routes P and the reference route P actually used is selected based on the return route PA. Therefore, according to the fourth embodiment, it is possible to move by using an appropriate reference route P.

Fifth Embodiment

Next, a fifth embodiment will be described. The fifth embodiment is different from the first embodiment in that in a case where the return route PA is set, a periphery of the return route PA is set to a prohibited region where a movement of another moving body 10 is not permitted. In the fifth embodiment, description of the parts with a configuration common to the first embodiment will not be repeated. The fifth embodiment can also be applied to the second embodiment to the fourth embodiment.

Figure 14:
FIG. 14 is a schematic block diagram of an information processing device according to a fifth embodiment.
Figure 14:
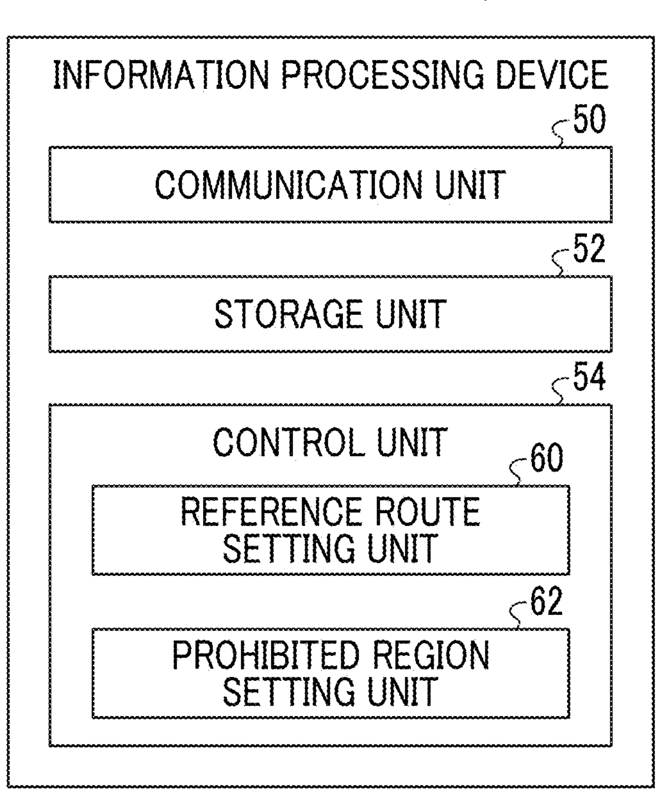
Figure 15:
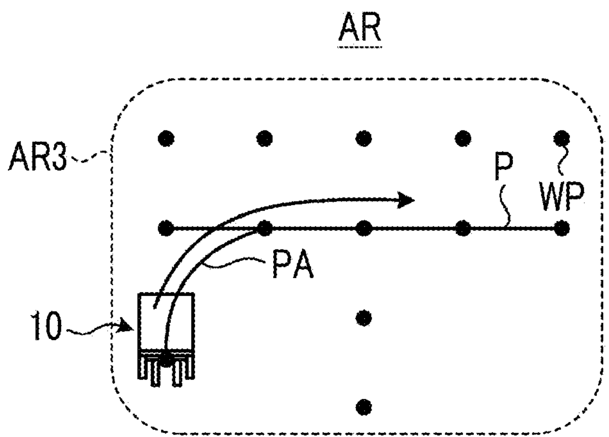
FIG. 15 is a schematic diagram showing an example of a prohibited region.

FIG. 14 is a schematic block diagram of an information processing device according to a fifth embodiment, and FIG. 15 is a schematic diagram showing an example of the prohibited region. As shown in FIG. 14, the control unit 54 of the information processing device 14 according to the fifth embodiment includes a prohibited region setting unit 62 that sets the prohibited region. The prohibited region is a region where a movement (approach) of one moving body 10 is permitted but a movement (approach) of the other moving body 10 is not permitted, and can also be referred to as an exclusive region. In the fifth embodiment, in a case where the moving body 10 is not positioned on the reference route P, the prohibited region setting unit 62 sets a region around the return route PA set for the moving body 10 as a prohibited region AR3 that prohibits approaches of other moving bodies 10 other than the moving body 10, as shown in FIG. 1S. The prohibited region setting unit 62 prohibits the other moving body 10 from approaching the prohibited region AR3 in a time period in which the moving body 10 is scheduled to move along the reference route P.

In the present embodiment, since the return route PA is set by the moving body 10, the prohibited region setting unit 62 cannot recognize a position of the return route PA. Therefore, in the present embodiment, the prohibited region setting unit 62 acquires information indicating that the moving body 10 is not positioned on the reference route P from the moving body 10, and in a case where the prohibited region setting unit 62 acquires the information, the prohibited region setting unit 62 sets a region around the reference route P as the prohibited region AR3. For example, the prohibited region setting unit 62 sets a region within a range of a predetermined distance from the reference route P as the prohibited region AR3. Since the return route PA is set in a vicinity of the reference route P, it can be said that the prohibited region AR3 around the reference route P is set around the return route PA.

Meanwhile, the prohibited region setting unit 62 is not limited to setting the prohibited region AR3 based on the reference route P. For example, the prohibited region setting unit 62 may acquire the current position of the moving body 10 (for example, a waiting position of the moving body 10) and set the prohibited region AR3 based on the current position of the moving body 10. In this case, for example, the prohibited region setting unit 62 may set a region within a range of a predetermined distance from the current position of the moving body 10 as the prohibited region AR3. In addition, the prohibited region setting unit 62 may set the prohibited region AR3 based on a return region PA. For example, the prohibited region setting unit 62 may acquire the information of the return route PA from the moving body 10 and set a region within a range of a predetermined distance from the return route PA as the prohibited region AR3.

As described above, by setting the periphery of the return route PA, which is not set in advance, as the prohibited region AR3, it is possible to prevent a deadlock or a collision with another moving body when the moving body 10 is moving on the return route PA.

Effects

A route setting method according to a first aspect of the present disclosure includes a step of acquiring information of a reference route P which is a route along which a moving body 10 moves, a step of determining whether or not the moving body 10 is positioned on the reference route P, and a step of setting a return route PA which is a route for reaching a merging position A on the reference route P in a case where the moving body 10 is not positioned on the reference route P. According to the present disclosure, it is possible to reach the merging position A through the return route PA, and thus it is possible to appropriately move along the reference route P from the merging position A.

A route setting method according to a second aspect of the present disclosure is the route setting method according to the first aspect, in which in the step of setting the return route PA, the return route PA is set such that the moving body 10 moving along the return route PA does not interfere with an obstacle T. According to the present disclosure, it is possible to return to the reference route P without interfering with the obstacle T.

A route setting method according to a third aspect of the present disclosure is the route setting method according to the first aspect or the second aspect, in which in the step of setting the return route PA, the merging position A is selected from among a plurality of candidate positions on the reference route P, and the return route PA to the selected merging position A is set. According to the present disclosure, the merging position A is selected from among the plurality of candidate positions. Therefore, the appropriate return route PA for being capable of returning to the reference route P can be set, and it is possible to appropriately move along the reference route P.

A route setting method according to a fourth aspect of the present disclosure is the route setting method according to the third aspect, in which in the step of setting the return route PA, a candidate route to the candidate position is set for each of the candidate positions, and the return route PA is selected from among a plurality of the candidate routes. According to the present disclosure, the return route PA is selected from among the plurality of candidate routes. Therefore, the appropriate return route PA for being capable of returning to the reference route P can be set, and it is possible to appropriately move along the reference route P.

A route setting method according to a fifth aspect of the present disclosure is the route setting method according to the fourth aspect, in which in the step of setting the return route PA, a route on which the moving body 10 moving along the candidate route does not interfere with an obstacle T is selected as the return route PA, from among the plurality of candidate routes. According to the present disclosure, it is possible to return to the reference route P without interfering with the obstacle T.

A route setting method according to a sixth aspect of the present disclosure is the route setting method according to at least one of the first aspect to the fifth aspect, in which in the step of setting the return route PA, a route including at least one of a linear route PA2 having a linear shape that approaches the merging position A and an arc route PA1 having an arc shape that approaches the merging position A is set as the return route PA. According to the present disclosure, the return route PA can be appropriately set while reducing the arithmetic load.

A route setting method according to a seventh aspect of the present disclosure is the route setting method according to the sixth aspect, in which in the step of setting the return route PA, a route including a turning route PA0 away from the merging position A is set as the return route PA in a case where the moving body 10 interferes with an obstacle T, on a route including at least only one of the linear route PA2 and the arc route PA1. According to the present disclosure, the return route PA that does not interfere with the obstacle T can be set by setting the turning route PA0.

A route setting method according to an eighth aspect of the present disclosure is the route setting method according to the sixth aspect or the seventh aspect, in which in the step of setting the return route PA, a turn radius of the arc route PA1 is set by a binary search in which a minimum turn radius $R_{min}$ set in advance is set as a minimum value and a maximum turn radius $R_{max}$ set in advance is set as a maximum value. According to the present disclosure, the return route PA can be appropriately set while reducing the arithmetic load.

A route setting method according to a ninth aspect of the present disclosure is the route setting method according to at least one of the first aspect to the eighth aspect, in which in the step of setting the return route PA, the return route PA is set based on an approach route PB for approaching a target object Q in a case where the moving body 10 is not positioned on the reference route P because the moving body 10 has moved along the approach route PB from the reference route P. According to the present disclosure, since the return route PA is set using the approach route PB, the return route PA can be appropriately set while reducing the arithmetic load.

A route setting method according to a tenth aspect of the present disclosure is the route setting method according to at least one of the first aspect to the ninth aspect, in which in the step of acquiring the information of the reference route P, information of a plurality of the reference routes P is acquired, and in the step of setting the return route PA, the return route PA for reaching the merging position A is set for each of the plurality of reference routes P, and the reference route P to be used for the movement of the moving body 10 is selected from among the reference routes P based on each of the return routes PA. According to the present disclosure, the reference route P can be appropriately selected.

A route setting method according to an eleventh aspect of the present disclosure is the route setting method according to at least one of the first aspect to the tenth aspect, the route setting method further including a step of setting a periphery of the return route PA to a prohibited region AR3 in which a movement of another moving body is not permitted, while the moving body 10 is moving along the return route PA. According to the present disclosure, it is possible to prevent the deadlock or the collision with the other moving body when the moving body 10 is moving on the return route PA.

A program according to a twelfth aspect of the present disclosure causes a computer to execute a step of acquiring information of a reference route P which is a route along which a moving body 10 moves, a step of determining whether or not the moving body 10 is positioned on the reference route P, and a step of setting a return route PA which is a route for reaching a merging position A on the reference route P in a case where the moving body 10 is not positioned on the reference route P. According to the present disclosure, it is possible to reach the merging position A through the return route PA, and thus it is possible to appropriately move along the reference route P from the merging position A.

A moving body 10 according to a thirteenth aspect of the present disclosure is a moving body that automatically moves, the moving body 10 including a reference route acquisition unit 80 that acquires information of a reference route P which is a route for moving, and a return route acquisition unit 84 that acquires a return route PA which is a route for reaching a merging position A on the reference route P in a case where the moving body 10 is not positioned on the reference route P. According to the present disclosure, it is possible to reach the merging position A through the return route PA, and thus it is possible to appropriately move along the reference route P from the merging position A.

Although the embodiments of the present disclosure have been described above, the embodiments are not limited by the contents of the embodiments. In addition, the above-described components include those that can be easily assumed by those skilled in the art, those that are substantially the same, and those that are within a so-called equivalent range. Further, the above-described components can be combined as appropriate. Furthermore, various omissions, replacements, or modifications of the above-described components can be made without departing from the concept of the above-described embodiments.

REFERENCE SIGNS LIST

10: moving body
12: management device
14: information processing device
80: reference route acquisition unit
82: self-position acquisition unit
84: return route acquisition unit
86: movement control unit
A: merging position
P: reference route
PA: return route

The invention claimed is:

1. A route setting method comprising:
a step of acquiring information of a reference route which is a route along which a moving body moves;
a step of determining whether or not the moving body is positioned on the reference route;
a step of setting a return route which is a route for reaching a merging position on the reference route in a case where the moving body is not positioned on the reference route; and
a step of moving the moving body along the return route to the merging position,
wherein in the step of setting the return route, a route including either a single linear route having a linear shape that approaches the merging position, a single arc route having an arc shape that approaches the merging position, or a combination of a single linear route having a linear shape that approaches the merging position and a single arc route having an arc shape that approaches the merging position is set as a first candidate route,
if it is determined that the first candidate route does not interfere with an obstacle, the first candidate route is set as the return route,
if it is determined that the first candidate route interferes with an obstacle, a portion of a second candidate route that does not interfere with an obstacle is set as the return route, the second candidate route including a turning route away from the merging position.

2. The route setting method according to claim 1,
wherein in the step of setting the return route, the merging position is selected from among a plurality of candidate positions on the reference route, and the return route to the selected merging position is set.

3. The route setting method according to claim 2,
wherein in the step of setting the return route, a candidate route to the candidate position is set for each of the candidate positions, and the return route is selected from among a plurality of the candidate routes.

4. The route setting method according to claim 1, wherein in the step of setting the return route, a turn radius of the arc route is set by a binary search in which a minimum turn radius set in advance is set as a minimum value and a maximum turn radius set in advance is set as a maximum value.

5. The route setting method according to claim 1, wherein in the step of setting the return route, the return route is set based on an approach route for approaching a target object in a case where the moving body is not positioned on the reference route because the moving body has moved along the approach route from the reference route.

6. The route setting method according to claim 1, wherein in the step of acquiring the information of the reference route, information of a plurality of the reference routes is acquired, and in the step of setting the return route, the return route for reaching the merging position is set for each of the plurality of reference routes, and the reference route to be used for the movement of the moving body is selected from among the reference routes based on each of the return routes.

7. The route setting method according to claim 1, further comprising:

a step of setting a periphery of the return route to a prohibited region in which a movement of another moving body is not permitted, while the moving body is moving along the return route.

8. The route setting method according to claim 1, wherein in the step of setting the return route, a linear route that is away from the merging position is set as the turning route.

9. The route setting method according to claim 1, wherein in the step of setting the return route, in a case where there are a plurality of candidate routes that do not interfere with an obstacle from among candidate routes for the return route including the turning route, a candidate route in which a turn radius of the arc route is at its maximum is selected as the return route from among the plurality of candidate routes.

10. A non-transitory computer-readable storage medium storing a program causing a computer to execute:

a step of acquiring information of a reference route which is a route along which a moving body moves;

a step of determining whether or not the moving body is positioned on the reference route;

a step of setting a return route which is a route for reaching a merging position on the reference route in a case where the moving body is not positioned on the reference route; and a step of moving the moving body along the return route to the merging position, wherein in the step of setting the return route, a route including either a single linear route having a linear shape that approaches the merging position, an single arc route having an arc shape that approaches the merging position, or a combination of a single linear route having a linear shape that approaches the merging position and an single arc route having an arc shape that approaches the merging position is set as a first candidate route, if it is determined that the first candidate route does not interfere with an obstacle, the first candidate route is set as the return route, if it is determined that the first candidate route interferes with an obstacle, a portion of a second candidate route that does not interfere with an obstacle is set as the return route, the second candidate route including a turning route away from the merging position.

11. A moving body that automatically moves, comprising:

a non-transitory memory configured to store a program;

a processor configured to execute the program stored on the memory to cause the moving body to:

acquire information of a reference route which is a route for moving;

acquire a return route which is a route for reaching a merging position on the reference route in a case where the moving body is not positioned on the reference route; and move the moving body along the return route to the merging position, set a first candidate route in which is a route including either a single linear route having a linear shape that approaches the merging position, an single arc route having an arc shape that approaches the merging position, or a combination of a single linear route having a linear shape that approaches the merging position and an single arc route having an arc shape that approaches the merging position, if it is determined that the first candidate route does not interfere with an obstacle, the first candidate route is set as the return route, if it is determined that the first candidate route interferes with an obstacle, a portion of a second candidate route that does not interfere with an obstacle is set as the return route, the second candidate route including a turning route away from the merging position.

* * * * *